United States Patent
Kurosaki et al.

(10) Patent No.: US 9,194,560 B2
(45) Date of Patent: Nov. 24, 2015

(54) LIGHT SOURCE DEVICE AND PROJECTOR

(71) Applicant: CASIO COMPUTER CO., LTD., Shibuya-ku, Tokyo (JP)

(72) Inventors: Hideyuki Kurosaki, Tachikawa (JP); Hideki Nakamura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 143 days.

(21) Appl. No.: 13/797,598

(22) Filed: Mar. 12, 2013

(65) Prior Publication Data

US 2013/0250255 A1     Sep. 26, 2013

(30) Foreign Application Priority Data

Mar. 21, 2012   (JP) .................... 2012-064536

(51) Int. Cl.
  *G03B 21/00*   (2006.01)
  *F21V 13/08*   (2006.01)
  *G03B 21/20*   (2006.01)
  *G03B 33/08*   (2006.01)

(52) U.S. Cl.
  CPC .............. *F21V 13/08* (2013.01); *G03B 21/204* (2013.01); *G03B 21/2013* (2013.01); *G03B 33/08* (2013.01)

(58) Field of Classification Search
  CPC ... G03B 21/14; G03B 21/204; G03B 21/2013
  USPC .......... 353/30, 31, 37, 38, 84, 85, 99; 362/84, 362/231, 293; 348/742–747
  See application file for complete search history.

(56) References Cited

U.S. PATENT DOCUMENTS

| | | | |
|---|---|---|---|
| 8,348,432 B2 | 1/2013 | Miyazaki | |
| 8,469,520 B2* | 6/2013 | Maeda | 353/31 |
| 8,678,596 B2* | 3/2014 | Sakata et al. | 353/31 |
| 8,840,253 B2* | 9/2014 | Kitano | 353/84 |
| 2009/0034284 A1* | 2/2009 | Li et al. | 362/554 |
| 2009/0262308 A1* | 10/2009 | Ogawa | 353/31 |
| 2009/0268167 A1* | 10/2009 | Narikawa | 353/31 |
| 2010/0245777 A1* | 9/2010 | Ogura | 353/38 |

(Continued)

FOREIGN PATENT DOCUMENTS

| | | |
|---|---|---|
| CN | 101937161 A | 1/2011 |
| JP | 2011-13320 A | 1/2011 |
| JP | 2011100163 A | 5/2011 |

OTHER PUBLICATIONS

Chinese Office Action dated Oct. 30, 2014, issued in counterpart Chinese Application No. 201310123436.5.

*Primary Examiner* — Sultan Chowdhury

(74) *Attorney, Agent, or Firm* — Holtz, Holtz, Goodman & Chick PC

(57) ABSTRACT

A light source device includes first to third light sources, a fluorescent material, and a dichroic mirror. The dichroic mirror is constituted so that excitation light emitted from the first light source is transmitted through the dichroic mirror and applied to the fluorescent material, light of a first wavelength bandwidth emitted from the second light source is transmitted through the dichroic mirror and emitted in a predetermined emitting direction, generated light emitted from the fluorescent material is reflected by the dichroic mirror and emitted in the predetermined emitting direction, and at least a part of light of a second wavelength bandwidth from the third light source passes the outside of the dichroic mirror without entering the dichroic mirror, and is emitted in the predetermined emitting direction.

6 Claims, 5 Drawing Sheets

(56) References Cited

U.S. PATENT DOCUMENTS

2010/0328632 A1 12/2010 Kurosaki et al.
2011/0043762 A1* 2/2011 Miyamae et al. ............... 353/20
2012/0081672 A1* 4/2012 Okuda et al. ................... 353/20

* cited by examiner

LIGHT SOURCE DEVICE AND PROJECTOR

CROSS-REFERENCE TO RELATED APPLICATIONS

This application is based upon and claims the benefit of priority under 35 USC 119 of Japanese Patent Application No. 2012-064536 filed on Mar. 21, 2012, the entire disclosure of which, including the description, claims, drawings, and abstract, is incorporated herein by reference in its entirety.

BACKGROUND OF THE INVENTION

1. Field of the Invention

The present invention relates to a light source device and a projector provided with the light source device.

2. Description of the Related Art

Nowadays, data projectors are often used as image projecting devices for projecting images, such as displays of personal computers, video images and, images of image data stored in memory cards, on screens. Each of these projectors gathers light projected from light sources on a micromirror display device called a digital micromirror device (DMD®) or a liquid crystal display panel, to display color images on a screen.

Heretofore, in this type of projector, a discharge lamp having a high luminance has been mainly used as a light source, but in recent years, there have been made developments and suggestions of employing a light emitting diode, a laser diode, an organic EL or a fluorescent material as the light source. For example, in Jpn. Pat. Appln. KOKAI Publication No. 2011-13320, a light source device has been suggested which emits blue light obtained by dispersing an excitation light from a laser light source for emitting the excitation light having a blue wavelength, red light from a red color emitting diode for emitting the red light, and green light from a fluorescent material for emitting the green light by receiving the excitation light from the laser light source. In this light source device, a dichroic mirror is used which can transmit or reflect an arbitrary wavelength, to synthesize the blue light, the green light and the red light from the respective light sources on one image display device.

As described above, in the case of the light source device in which the light obtained by synthesizing light having different wavelengths is applied to the image display device, the dichroic mirror having characteristics of reflecting and transmitting a light of each wavelength is required. In the dichroic mirror, however, a transmittancy is poorer than an untreated glass and a reflectance is poorer than a total reflection mirror, owing to properties of a dichroic film to be used. Therefore, there is the problem that each time the light is transmitted and reflected, optical efficiency deteriorates. As a result of the loss of light by this dichroic mirror, the amount of light applied to the image display device from the light source device decreases. Consequently, an image projected from the projector is disadvantageously dark.

BRIEF SUMMARY OF THE INVENTION

The present invention has been developed in view of the above respects, an object thereof is to provide a light source device which can decrease the influence of loss of light by a dichroic mirror, and a projector equipped with the light source device.

According to a first aspect of the invention, there is provided a light source device comprising: a first light source which emits an excitation light; a second light source which emits light of a first wavelength bandwidth; a third light source which emits light of a second wavelength bandwidth different from the first wavelength bandwidth; a fluorescent material which receives the excitation light from the first light source to emit generated light of a third wavelength bandwidth different from the first and second wavelength bandwidths; and a dichroic mirror which transmits the light of the first wavelength bandwidth and reflects the light of the third wavelength bandwidth, wherein the dichroic mirror is constituted so that the excitation light emitted from the first light source is transmitted through the dichroic mirror and applied to the fluorescent material, the light of the first wavelength bandwidth emitted from the second light source is transmitted through the dichroic mirror and emitted in a predetermined emitting direction, the generated light emitted from the fluorescent material is reflected by the dichroic mirror and emitted in the predetermined emitting direction, and at least a part of the light of the second wavelength bandwidth from the third tight source passes the outside of the dichroic mirror without entering the dichroic mirror, and is emitted in the predetermined emitting direction.

According to a second aspect of the invention, there is provided a projector comprising: a light source device according to claim 1; a display device; a light source side optical system which guides the light from the light source device to the display device; a projecting side optical system which projects an image emitted from the display device; and a projector control section which controls the light source device and the display device.

According to the present invention, at least a part of light having a first wavelength is synthesized with another light of a different wavelength, without being transmitted through a dichroic mirror. Hence, it is possible to provide a light source device which can decrease the influence of loss of light by the dichroic mirror, and a projector equipped with the light source device.

BRIEF DESCRIPTION OF THE SEVERAL VIEWS OF THE DRAWINGS

The present invention will more sufficiently be understood by the following detailed description and the accompanying drawings, which are, however, exclusively for explanation and do not limit the scope of the present invention.

Here.

DETAILED DESCRIPTION OF THE INVENTION

Hereinafter, embodiments for carrying out the present invention will be described with reference to the drawings.

[First Embodiment]

Figure 1:
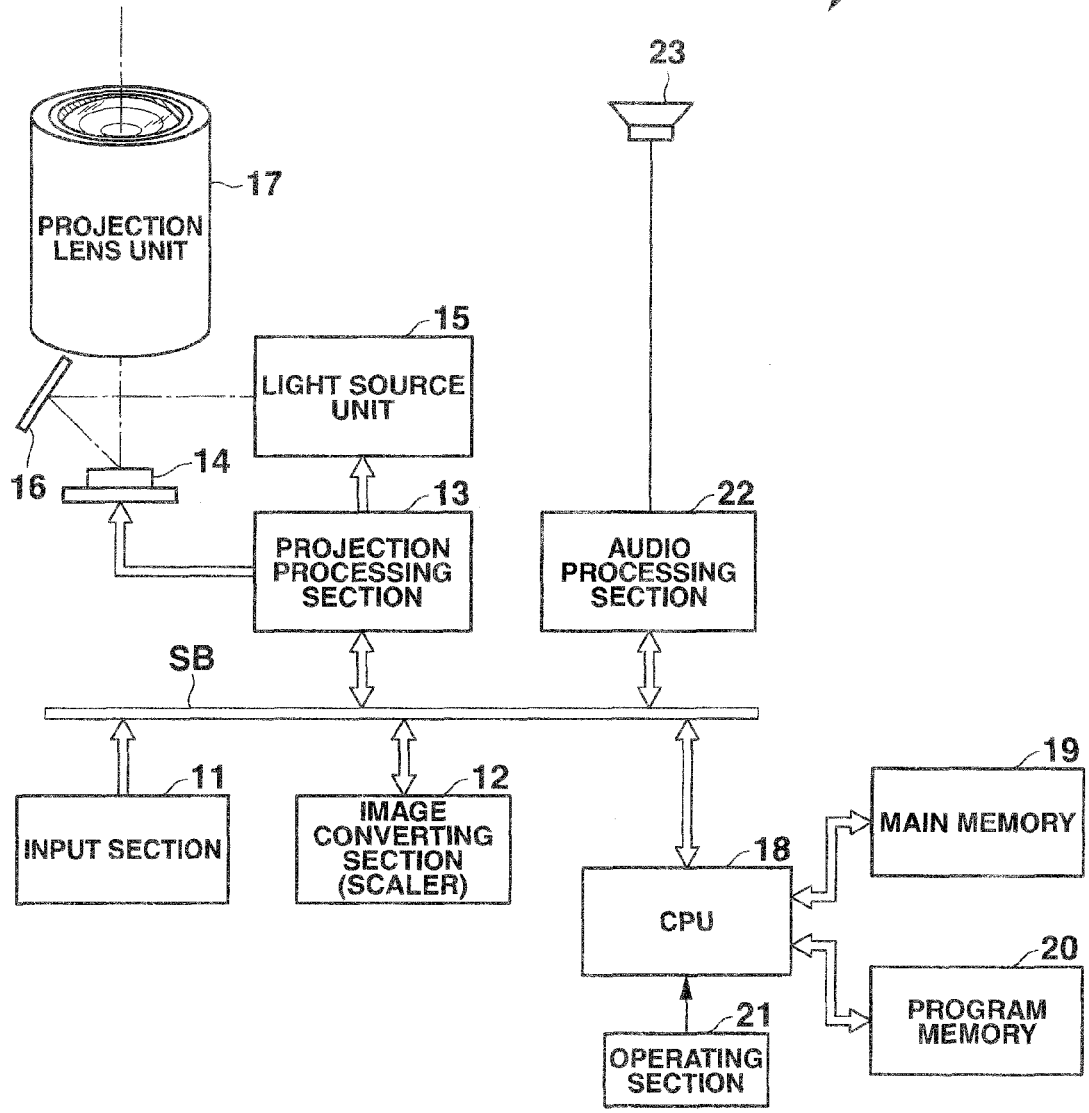
FIG. 1 is a schematic block diagram showing a constitution example of a projector according to a first embodiment of the present invention.

In a projector according to a first embodiment of the present invention, there is employed a digital light processing (DLP®) system using a micromirror display device. FIG. 1 schematically shows a constitution of a projector 10 of the present embodiment. The projector 10 includes an input section 11, an image converting section 12, a projection processing section 13 as a projector control section which controls a light source device and a display device, a micromirror device 14 as the display device, a light source unit 15 as a light source device according to the first embodiment of the present invention, a mirror 16 as a light source side optical system which guides light from the light source device onto the display device, a projection lens unit 17 as a projecting side optical system which projects an image emitted from the display device on a screen or the like, a CPU 18, a main memory 19, a program memory 20, an operating section 21, an audio processing section 22, and a speaker 23.

The input section 11 is provided with terminals such as a pin jack (RCA) type video input terminal and/or a D-sub type RGB input terminal, and through the terminal, analog image signal is input. The input section 11 converts the input analog image signal of various specifications to a digital image signal. The input section 11 outputs the converted digital image signal to the image converting section 12 via a system bus SB. It is to be noted that the input section 11 may be provided with, for example, an HDMI® terminal through which the digital image signal may be input in addition to or in place of the analog image signal. Moreover, an analog or digital audio signal is input into the input section 11. The input section 11 outputs the input audio signal to the audio processing section 22 via, the system bus SB.

The image converting section 12 is also called a scaler. The image converting section 12 converts input image data to image data of a predetermined format which is suitable for projection, and transmits the converted data to the projection processing section 13. If necessary, the image converting section 12 transmits the image data on which symbols indicating various operation states for on-screen display (OSD) are superimposed, as processed image data, to the projection processing section 13.

The light source unit 15 emits color light including primary color light of red (R), green (G) and blue (B). The light emitted from the light source unit 15 is totally reflected by the mirror 16 to strike the micromirror device 14. Here, the light source unit 15 is constituted to emit the each color light sequentially in a time sharing manner, or may be constituted to always emit all the color light. The choice of which constitution depends on whether or not a color image is represented by a frame sequential method. Hereinafter, constitutions of the respective sections will be described in accordance with the frame sequential method as an example.

The micromirror device 14 includes micromirrors arranged in an array manner. Each of the micromirrors is operated to turn on and off at a high speed, thereby reflecting the emitted light from the light source unit 15 toward the projection lens unit 17 or away from the direction toward the projection lens unit 17. In the micromirror device 14, the micromirrors are arranged in, for example, a wide extended graphic array (WXGA) (horizontal 1280 pixels×vertical 800 pixels). Because of the reflection by each of the micromirrors, the micromirror device 14 forms, for example, an image of a WXGA resolution. In this way, the micromirror device 14 functions as a spatial light modulating device.

The projection processing section 13 drives the micromirror device 14 in accordance with the image data transmitted from the image converting section 12, to display an image represented by the image data. That is, the projection processing section 13 operates each of the micromirrors of the micromirror device 14 so that the micromirror turns on or off. Here, the projection processing section 13 drives the micromirror device 14 at the high speed in the time sharing manner. The number of divisions of a unit time is obtained by multiplying a frame rate, such as 60 frames/second, in accordance with the predetermined format, the number of divisions of a color component, and a display gradation number. Moreover, the projection processing section 13 also controls an operation of the light source unit 15 synchronously with the operation of the micromirror device 14. That is, the projection processing section 13 divides each frame by the time, and controls the operation of the light source unit 15 to sequentially emit the light of all the color components for each frame.

The projection lens unit 17 regulates the light guided from the micromirror device 14, to project the light on, for example, the unshown screen. Therefore, the light image formed by using the reflected light of the micromirror device 14 is projected and displayed on the screen through the projection lens unit 17.

The audio processing section 22 includes a sound source circuit of a PCM sound source or the like. On the basis of input analog audio data from the input section 11, or on the basis of an analog signal converted from digital audio data obtained at a projecting operation, the audio processing section 22 drives the speaker 23 to amplify and discharge a sound. Moreover, the audio processing section 22 generates a beep sound or the like, if necessary. The speaker 23 is a usual speaker which emits the sound based on the input signal from the audio processing section 22.

The CPU 18 controls operations of the image converting section 12, the projection processing section 13 and the audio processing section 22. The CPU 18 is connected to the main memory 19 and the program memory 20. The main memory 19 is constituted of, for example, an SRAM. The main memory 19 functions as a work memory of the CPU 18. The program memory 20 is constituted of an electrically rewritable nonvolatile memory. The program memory 20 stores an operation program to be executed by the CPU 18, various regular form data and the like. Furthermore, the CPU 18 is connected to the operating section 21. The operating section 21 includes a key operating portion disposed in a main body of the projector 10, and an infrared ray receiving portion which receives an infrared ray from an unshown remote controller for exclusive use in the projector 10. The operating section 21 outputs, to the CPU 18, a key operation signal based on a key operated with the key operating portion of the main body or the remote controller by a user. The CPU 18 controls the operations of the respective sections of the projector 10 in accordance with a user's instruction from the operating section 21 by use of the program and data stored in the main memory 19 and the program memory 20.

Figure 2:
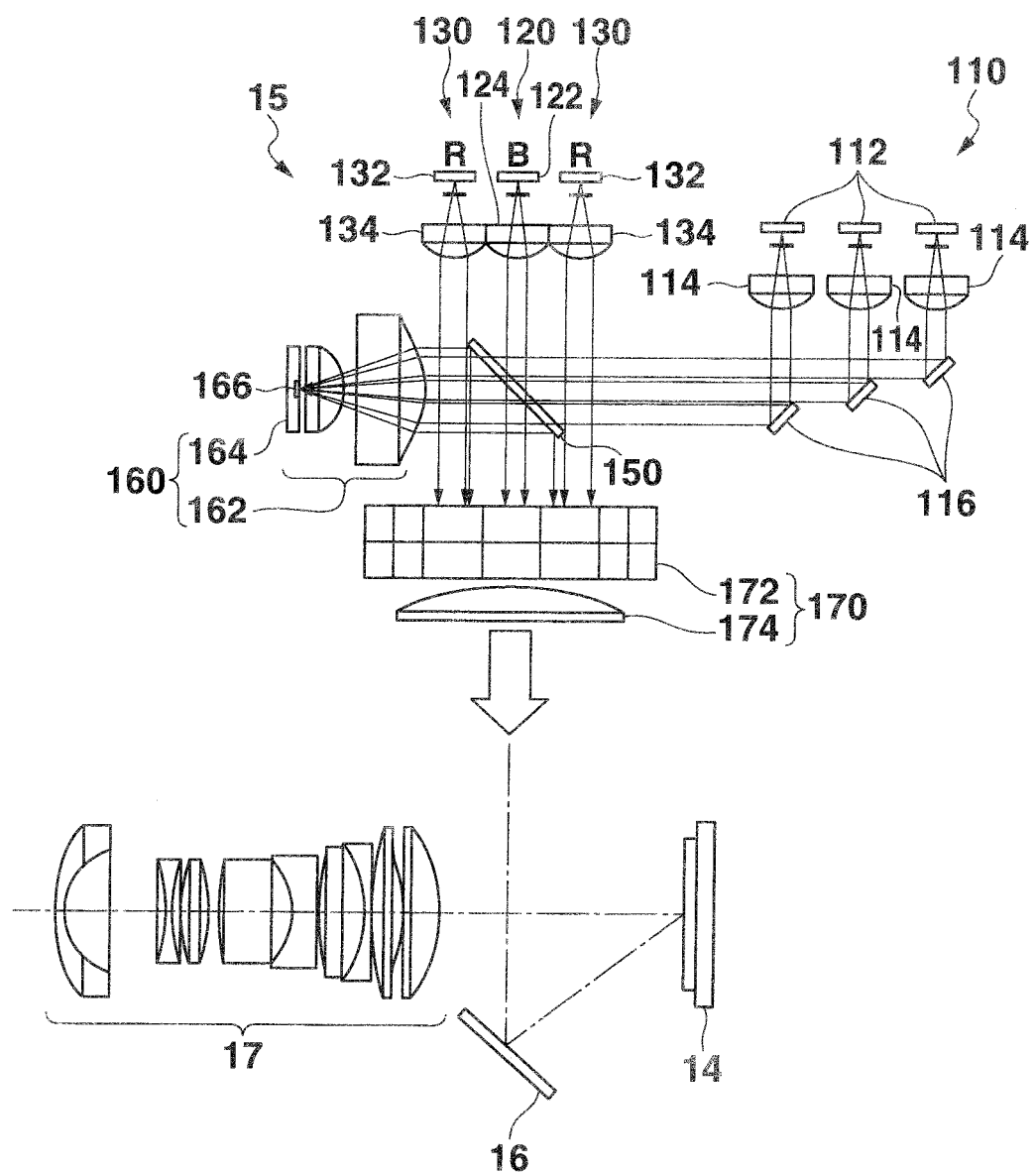
FIG. 2 is a schematic view showing an example of an optical system including a light source device according to the first embodiment of the present invention.

Next, the optical system of the projector 10 according to the present embodiment including the light source unit 15, the mirror 16, the micromirror device 14 and the projection lens unit 17 will be described with reference to FIG. 2.

The light source unit 15 as the light source device according to the first embodiment of the present invention is provided with a first light source 110 which emits blue excitation light, a second light source 120 which emits blue light, a third light source 130 which emits red light, a dichroic mirror 150, a fluorescent unit 160, and an optical system 170.

The first light source 110 includes one blue semiconductor laser (laser diode; LD) 112 as a semiconductor light emitting element which emits the blue excitation light, or includes the blue LDs. Moreover, the first light source 110 includes first collimator lens(es) 114 and mirrors 116 corresponding to the (respective) blue LD(s) 112. In the first light source 110 having such a constitution, the blue excitation light (the laser light) from the blue LD(s) 112 is converted to substantially parallel light by the first collimator lenses 114, reflected by the mirror(s) 116, and emitted toward the dichroic mirror 150.

The second light source 120 includes one blue light emitting diode (LED) 122 as a semiconductor light emitting element which emits the blue light, or includes the blue LEDs. The blue LED 122 is disposed so that an optical axis of the diode has an angle of about 90 degrees with an optical axis of the first light source 110. Moreover, the second light source 120 includes one second collimator lens 124 corresponding to the blue LED 122, or includes the second collimator lenses corresponding to the respective blue LEDs. In the second light source 120 having such a constitution, the blue light from the blue LED 122 is converted to substantially parallel light by the second collimator lens 124; and emitted toward the dichroic mirror 150.

The third light source 130 includes one red LED 132 as a semiconductor light emitting element which emits the red light, or includes the red LEDs. Additionally, when the third light source includes the red LEDs 132, the third light source is divided and disposed so that the second light source 120 is sandwiched between the divided red LEDs as shown in FIG. 2. Moreover, the red LED(s) 132 is(are) disposed so that an optical axis of the diode has an angle of about 90 degrees with the optical axis of the first light source 110. Furthermore, the third light source 130 includes third collimator lens(es) 134 corresponding to the (respective) red LED(s) 132. In the third light source 130 having such a constitution, the red light from the red LED(s) 132 is(are) converted to substantially parallel light by the third collimator lens(es) 134, and emitted toward the dichroic mirror 150.

The dichroic mirror 150 is disposed with a tilt of 45 degrees to both of the optical axis of the first light source 110 and the optical axes of the second and third light source 120 and 130. The dichroic mirror 150 includes a dichroic film having characteristics of transmitting a light of blue wavelength band and reflecting a light of green wavelength band. Therefore, the dichroic mirror 150 can transmit the blue excitation light coming from the (respective) blue LD(s) 112 of the first light source 110 to apply the light to the fluorescent unit 160, and can transmit the blue light coming from the second light source 120 to apply the light to the optical system 170. Moreover, the dichroic mirror 150 reflects generated green light emitted from the fluorescent unit 160 described later, to guide the light to the optical system 170.

Additionally, the red light emitted from the third light source 130 toward the dichroic mirror 150 passes the outside of the dichroic mirror 150 without entering the dichroic mirror, and is applied to the optical system 170. In this way, in the light source device according to the first embodiment, a size of the dichroic mirror 150 and arranging positions of the dichroic mirror 150 and the third light source 130 are designed so that the red light from the third light source 130 passes the outside of the dichroic mirror 150.

The fluorescent unit 160 includes a condensing optical system 162 and a fluorescent plate 164. The condensing optical system 162 condenses the incident blue excitation light from the dichroic mirror 150 on a fluorescent material 166 of the fluorescent plate 164. The fluorescent material 166 of the fluorescent plate 164 is excited by the blue excitation light to emit generated light including a large amount of components of wavelengths of 500 to 600 nm (a green wavelength bandwidth) and having an extensive wavelength distribution. The emitted light is isotropically radiated from the fluorescent material 166, but is emitted toward the condensing optical system 162 by a reflecting plate (not shown) disposed in the fluorescent plate 164, to travel toward the dichroic mirror 150 through the condensing optical system 162. Then, the light is reflected by the dichroic mirror 150, and a direction of optical axis of the light is changed so that the optical axis crosses that of the blue excitation light from the first light source 110 at 90 degrees. As a result, the emitted light from the fluorescent unit 160 which includes a large amount of a green wavelength component is guided to the optical system 170.

The optical system 170 includes a microlens array 172 and a lens 174. The microlens array 172 has a constitution in which microlenses (not shown) are gathered in a two-dimensional array manner. The microlens array 172 transforms the light coming through the dichroic mirror 150 to plane light. The plane light is applied to the lens 174. The lens 174 guides, to the mirror 16, the plane light coming through the microlens array 172, i.e., the generated green light including the large amount of the green wavelength component of the emitted light from the fluorescent material excited by the blue excitation light of the first light source 110, the blue light emitted from the second light source 120, and the red light emitted from the third light source 130, so that the plane light is applied to the micromirror device 14.

The generated green light, the blue light and the red light reflected by the mirror 16 are applied to the micromirror device 14, respectively. The micromirror device 14 forms a light image by use of the light reflected toward the projection lens unit 17. This light image is projected on an unshown screen of a projection object or the like through the projection lens unit 17.

Next, an operation of the projector 10 according to the present embodiment will be described. Additionally, the following operation is executed by the projection processing section 13 under the control of the CPU 18. The projection processing section 13 controls, for example, emission timings of the blue LD(s) 112 for the generated green light, the red LED(s) 132 for the red light and the blue LED(s) 122 for the blue light, the operation of the micromirror device 14 and the like.

There will be described an example where three color light of the red light (R), the generated green light (G) and the blue light (B) is allowed to enter the micromirror device 14. At an entrance timing of the red light into the micromirror device 14, the red LED(s) 132 is(are) turned on, and the blue LD(s) 112 and the blue LED(s) 122 are turned off. At an entrance timing of the generated green light into the micromirror device 14, the blue LD(s) 112 is(are) turned on, and the blue LED(s) 122 and the red LED(s) 132 are turned off. At an entrance timing of the blue light into the micromirror device 14, the blue LED(s) 122 is(are) turned on, and the blue LD(s) 112 and the red LED(s) 132 are turned off. In this way, the red light, the generated green light and the blue light sequentially enter the micromirror device 14.

That is, when the red LED(s) 132 is(are) turned on, the red light emitted from the red LED(s) 132 passes the outside of the dichroic mirror 150 through the third collimator lens(es) 134, and is guided to the optical system 170 where the plane light is obtained. This plane light enters the micromirror device 14 via the mirror 16.

As the luminance of the red light based on the image data becomes higher, the micromirror device 14 lengthens a time to guide the incident light to the projection lens unit 17 every micromirror (every pixel), and as the luminance becomes lower, the device shortens the time to guide the incident light to the projection lens unit 17. That is, the projection processing section 13 controls the micromirror device 14 so that the micromirror corresponding to the high-luminance pixel is in an on-state for a long period of time and so that the micromirror corresponding to the low-luminance pixel is in an off-state for a long period of time. In this way, as to the emitted light from the projection lens unit 17, the luminance of the red is represented every micromirror (every pixel).

Similarly, when the blue LED(s) 122 is(are) turned on, the blue light emitted from the blue LED(s) 122 is applied to the dichroic mirror 150 through the second collimator lens(es) 124. This blue light is transmitted through the dichroic mirror 150, and transformed to the plane light through the optical system 170. This plane light enters the micromirror device 14 via the mirror 16. The luminance of the blue is represented by the micromirror device 14 every micromirror (every pixel).

When the blue LD(s) 112 is(are) turned on, the blue excitation light emitted from the blue LD(s) 112 is reflected by the mirror(s) 116 through the first collimator lens(es) 114, and applied to the dichroic mirror 150. Then, the blue excitation light is transmitted through the dichroic mirror 150, to enter the fluorescent unit 160. Owing to the incident blue excitation light, the generated light including the large amount of the green wavelength component is emitted from the fluorescent unit 160. This generated green light is reflected by the dichroic mirror 150 to enter the micromirror device 14 via the optical system 170 and the mirror 16. The luminance of the green is represented by the micromirror device 14 every micromirror (every pixel).

For each frame, an image is represented by combining the colors each having the luminance represented at a time when the micromirror is in the on-state. As above, the projection lens unit 17 emits a projecting light indicating the represented image. When this projecting light is projected on, for example, the screen, the image is displayed on the screen or the like.

As above, according to the present embodiment, the light source unit 15 includes the first light source 110 which emits the blue excitation light having a first wavelength; the second light source 120 which emits the blue light having the first wavelength; the third light sources 130 which emit the red light having a second wavelength different from the first wavelength; the fluorescent material 166 which receives the excitation light from the first light source 110 to generate and emit the generated light including a large amount of a green component having a third wavelength different from the first and second wavelengths, and having an extensive wavelength distribution; and the dichroic mirror 150 which transmits the blue light and reflects the green light. The light source unit is a light source device which emits the blue, green and red light in a predetermined emitting direction which is a direction toward the optical system 170. Moreover, the dichroic mirror 150 is constituted in such a size and is disposed at such a position that the blue excitation light emitted from the first light source 110 is transmitted through the dichroic mirror 150 and applied to the fluorescent material 166, the blue light emitted from the second light source 120 is transmitted through the dichroic mirror and emitted in the predetermined emitting direction, the generated light emitted from the fluorescent material 166 is reflected by the dichroic mirror 150 and emitted in the predetermined emitting direction, and at least a part of the red light from the third light source 130 passes the outside of the dichroic mirror 150 without entering the dichroic mirror, and is emitted in the predetermined emitting direction.

According to the light source unit 15 having such a constitution, the light having one of the three wavelengths is emitted without being transmitted through the dichroic mirror 150, and accordingly, it is possible to provide a light source device which can decrease the influence of loss of light by the dichroic mirror 150, and a projector equipped with the light source device.

Especially in the present embodiment, the dichroic mirror 150 is constituted in such a size and disposed at such a position that all the red light from the third light source 130 passes the outside of the dichroic mirror 150 without entering the dichroic mirror. Therefore, the dichroic mirror 150 does not require characteristics of transmitting light of a red wavelength band, and hence more suitable reflecting characteristics can easily be designed. In particular, the emitted light from the fluorescent material 166 has an extensive wavelength distribution including the large amount of the green component. Consequently, in a conventional dichroic mirror constituted to also transmit the red, the green component in the vicinity of the red wavelength band is transmitted without being reflected, and hence loss of the emitted light from the fluorescent material 166 is produced. On the other hand, in the present embodiment, it is not necessary to make a design in consideration of the red wavelength band, and it is possible to make a design for imparting characteristics of reflecting light of a broad green wavelength band so that the green component in the vicinity of the red wavelength band which has heretofore caused a loss is also reflected. Therefore, the emitted light from the fluorescent material 166 can effectively be utilized. Therefore, in the light source device according to the present embodiment, not only bright red light but also bright green light can be obtained. Consequently, a total amount of the light to be emitted increases, and the projector 10 according to the present embodiment equipped with such a light source device can brightly project an image.

Moreover, the light from the second light source 120 has a wavelength which is close to that of the excitation light from the first light source 110. Therefore, in designing the transmitting characteristics of the dichroic mirror 150, an only blue wavelength band of the excitation light from the first light source 110 may be taken into consideration, and hence it is possible to easily design more suitable transmitting characteristics of the dichroic mirror 150.

[Second Embodiment]

Next, a second embodiment of the present invention will be described. A projector according to the second embodiment is different from the first embodiment only in a constitution of a dichroic mirror 150 of a light source unit 15, and the other constitutions of the projector are similar to those of the first embodiment. Therefore, the description of the similar part is omitted, and an only different part will be described.

Figure 3:
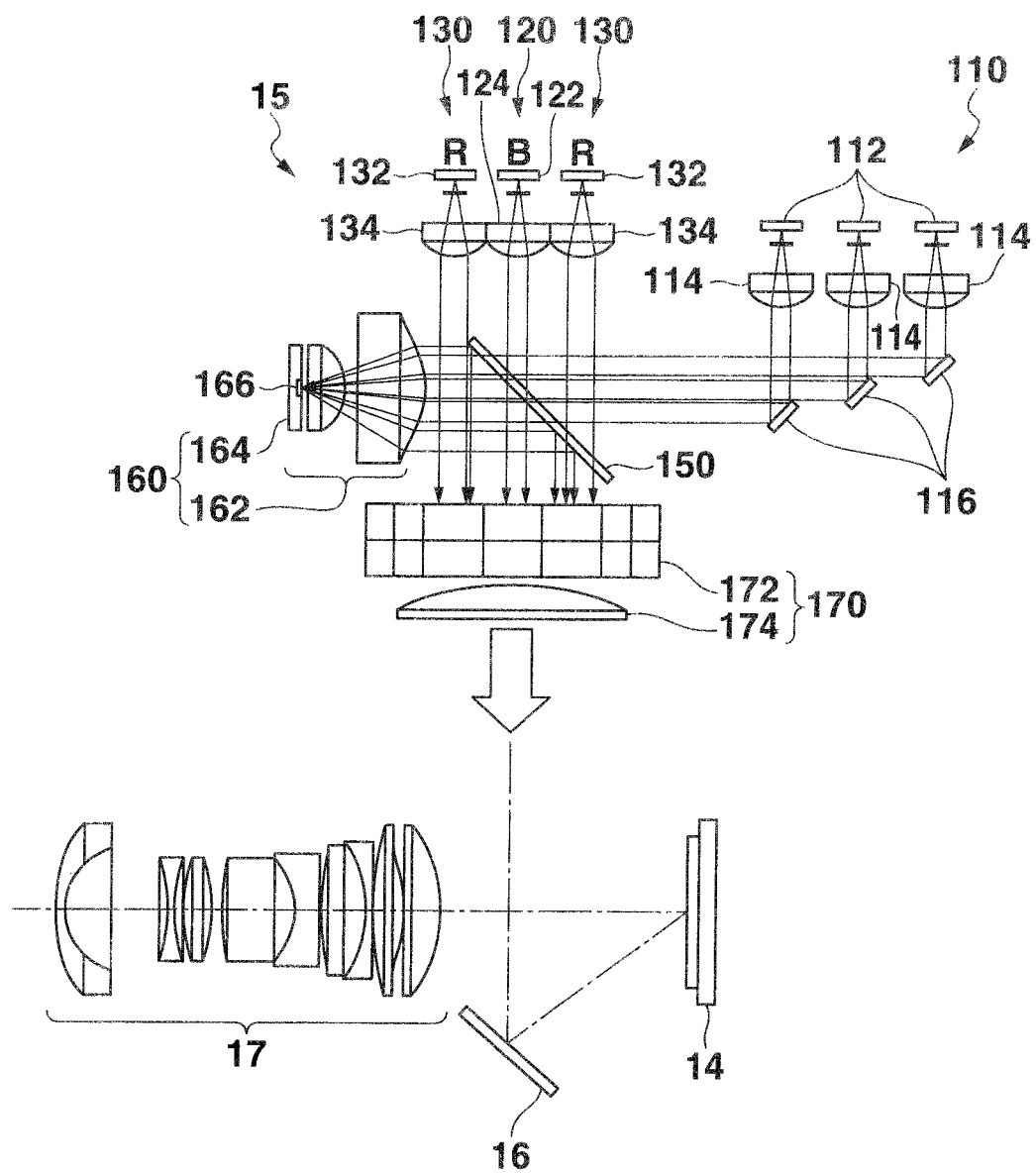
FIG. 3 is a schematic view showing an example of an optical system including a light source device according to a second embodiment of the present invention.

The light source unit 15 as a light source device according to the second embodiment includes the dichroic mirror 150 having a constitution shown in FIG. 3.

That is, in the second embodiment, the dichroic mirror 150 is constituted to also transmit red light having a second wavelength in addition to blue light having a first wavelength. Moreover, the dichroic mirror 150 is constituted in such a size and disposed at such a position that red light from one of two red LEDs 132 of a third light source 130 arranged adjacent to each other via a second light source 120 passes the outside of the dichroic mirror 150 without entering the dichroic mirror, and is emitted in a predetermined emitting direction which is the direction toward an optical system 170, and red light from the other red LED 132 is transmitted through the dichroic mirror 150 and emitted in the predetermined emitting direction. That is, in the dichroic mirror 150 of the second embodiment, one side (the lower side in the drawing) of the dichroic mirror of the first embodiment is extended to enter an optical path of the red light emitted from the other red LED 132 of the third light source 130.

In the second embodiment, as compared with the first embodiment, the amount of red light decreases, because a part of the red light is transmitted through the dichroic mirror 150, but as compared with a conventional example where all the red light is transmitted through the dichroic mirror 150, the amount increases. Therefore, as compared with the conventional example, a brighter light, can be obtained.

Moreover, green has a wavelength of a high visual sensitivity. Therefore, when a green component is taken as much as possible, a visual brightness enhances. In the second embodiment, the dichroic mirror 150 is extended to the optical path of the red light emitted from the other red LED 132 of the third light source 130, and in this extended region, emitted light from a fluorescent material 166 of a fluorescent unit 160 can be reflected toward the optical system 170. Therefore, the amount of green light to be emitted from the light source unit 15 can be increased.

Consequently, a brightness which is almost close to that of the light source device according to the first embodiment can visually be obtained.

In this way, according to the light source unit 15 as the light source device of the second embodiment, a part of the light having one of three wavelengths is emitted without being transmitted through the dichroic mirror 150, and accordingly, it is possible to provide the light source device which can decrease the influence of loss of light by the dichroic mirror 150, and a projector equipped with the light source device.

[Third Embodiment]

Next, a third embodiment of the present invention will be described. A projector according to the third embodiment is different from the second embodiment only in a constitution of a dichroic mirror 150 of a light source unit 15, and the other constitutions of the projector are similar to those of the second embodiment. Therefore, the description of the similar part is omitted, and an only different part will be described.

Figure 4:
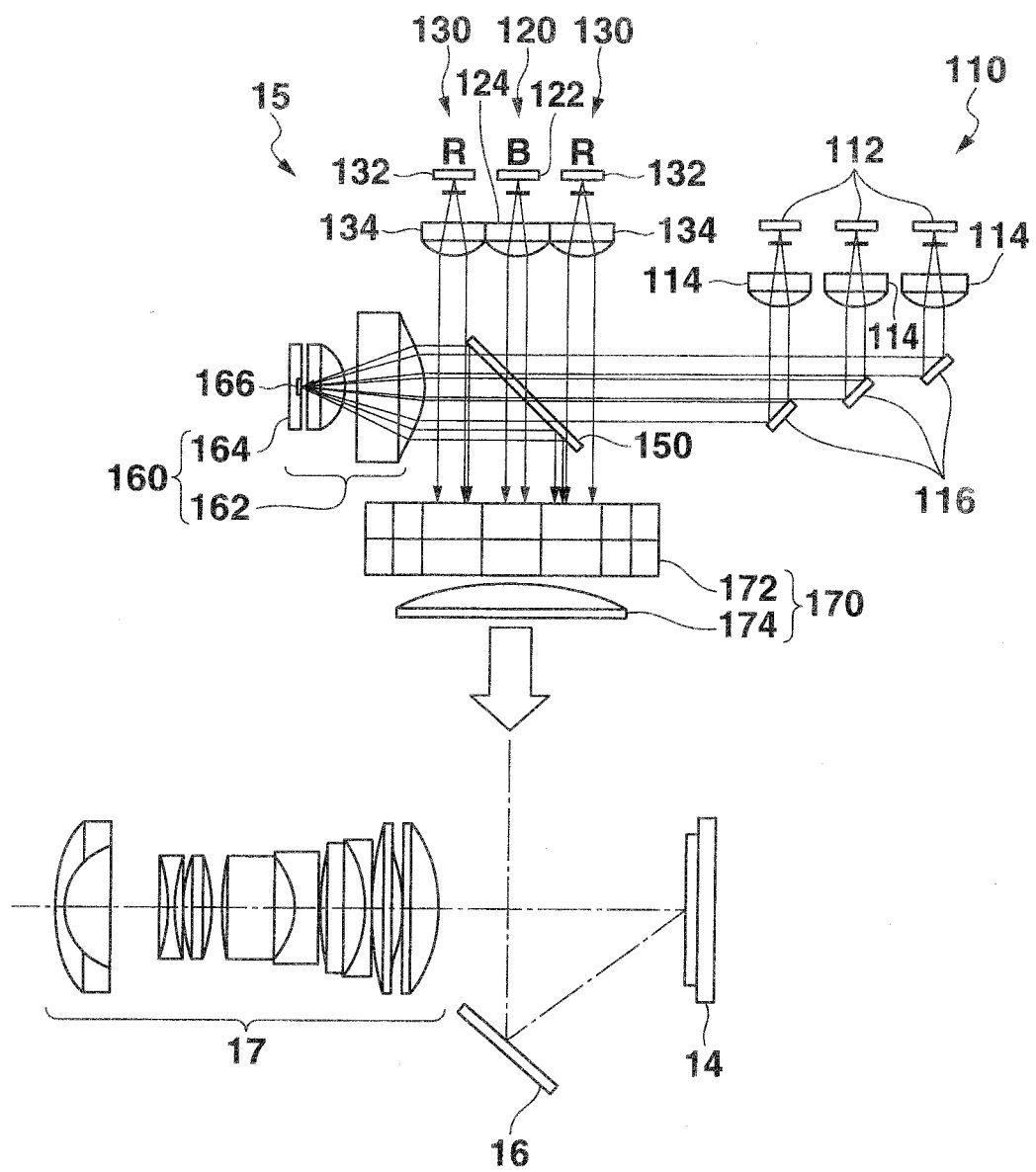
FIG. 4 is a schematic view showing an example of an optical system including a light source device according to a third embodiment of the present invention.

The light source unit 15 as a light source device according to the third embodiment includes the dichroic mirror 150 having a constitution shown in FIG. 4.

That is, in the third embodiment, the dichroic mirror 150 is constituted in such a size and disposed at such a position that red light from one of two red LEDs 132 of a third light source 130 arranged adjacent to each other via a second light source 120 passes the outside of the dichroic mirror 150 without entering the dichroic mirror, and is emitted in a predetermined emitting direction which is the direction toward an optical system 170, a part of red light from the other red LED 132 is transmitted through the dichroic mirror 150, and the remaining part of the red light from the other red LED 132 passes the outside of the dichroic mirror 150 without entering the dichroic mirror, and is emitted in the predetermined emitting direction. That is, in the dichroic mirror 150 of the third embodiment, a length of one extended side (the lower side in the drawing) of the dichroic mirror of the third embodiment is shorter than that of the second embodiment.

In the third embodiment, as compared with the first embodiment, the amount of red light decreases, because a part of the red light is transmitted through the dichroic mirror 150, but as compared with the second embodiment, a region which transmits the part of the red light is smaller, and hence a brighter light can be obtained.

However, a region which reflects an emitted light from a fluorescent material 166 of a fluorescent unit 160 toward the optical system 170 is small. Hence, the amount of a green light emitted from the light source unit 15 is smaller than that of the second embodiment. However, the amount of the light can be increased as compared with the first embodiment.

Consequently, also in the light source device according to the third embodiment, a brightness which is almost close to that of the light source device according to the first embodiment can visually be obtained.

In this way, according to the light source unit 15 as the light source device of the third embodiment, a part of the light having one of three wavelengths is emitted without being transmitted through the dichroic mirror 150, and accordingly, it is possible to provide the light source device which can decrease the influence of loss of light by the dichroic mirror 150, and a projector equipped with the light source device.

[Modification of Third Embodiment]

Figure 5A:
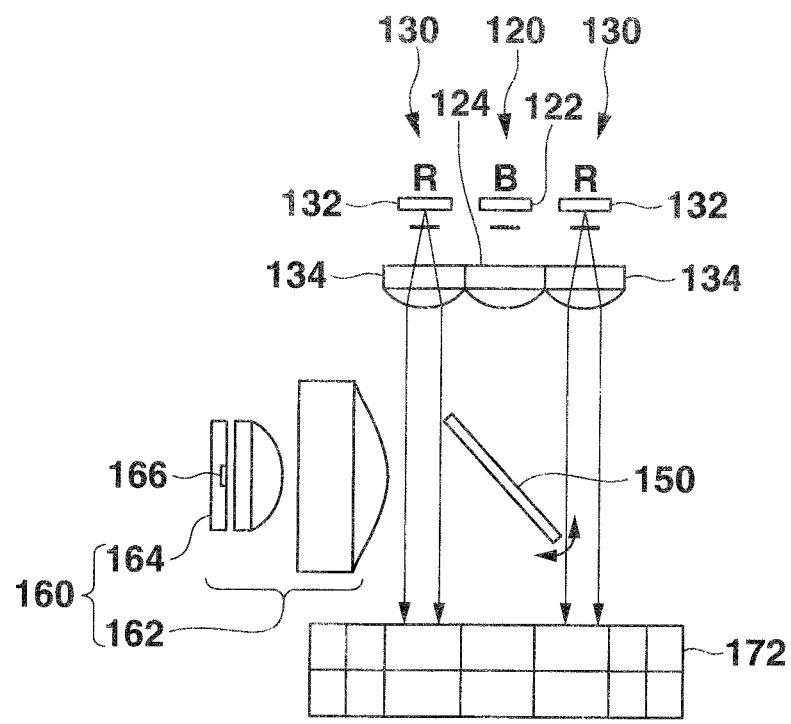
FIG. 5A is a schematic view showing a main part of a modification of the light source device according to the third embodiment.

Additionally, when third light source 130 is turned on to emit red light having a second wavelength, one extended side of a dichroic mirror 150 may be retracted from an optical path of the red light of the third light source 130 as shown in FIG. 5A.

Figure 5B:
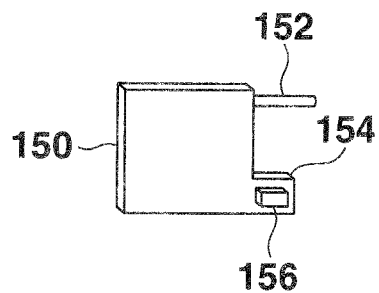
FIG. 5B is a schematic view showing an example of a retracting mechanism.

For this purpose, any retracting mechanism may be used. As shown in, for example, FIG. 5B, the other side of the dichroic mirror 150 which is not extended (the upper side in the drawing) is provided with a rod 152 which becomes a turning fulcrum. Moreover, on the one extended side, for example, a projecting portion 154 is disposed at a position which does not overlap with optical paths of blue excitation light from a first light source 110 and blue light from a second light source 120, a piezoelectric element 156 is disposed at the position of the projecting portion, and the piezoelectric element 156 is expanded and contracted to turn the dichroic mirror 150 around the rod 152 as the fulcrum.

In this way, when the red light is emitted, the dichroic mirror 150 is retracted from the optical path of the red light, so that bright red light can be obtained similarly to the first embodiment. Moreover, when green light is emitted, the dichroic mirror 150 is returned to a position of the optical path of the red light, so that bright green light can be obtained similarly to the third embodiment. Therefore, a light source device according to the present modification can obtain brighter light than the light source device according to the first embodiment. Additionally, in the present modification, the one extended side of the dichroic mirror 150 is retracted from the optical path of the red light of the third light source 130. However, also when the turning fulcrum 152 of the dichroic mirror 150 is disposed in the center of the dichroic mirror 150, the other side of the dichroic mirror 150 is also extended and the dichroic mirror 150 is turned to also retract the other side of the dichroic mirror from the optical path of the red light of the third light source 130, a similar effect can be obtained.

Additionally, in the first to third embodiments (and the modification), to generate the emitted light from the fluorescent material including the large amount of the green wavelength component, the blue component light is used in the excitation light, but needless to say, another color light such as an ultraviolet light may be used. In this case, needless to say, the dichroic mirror 150 is constituted to transmit the wavelength component of the excitation light.

Moreover, in the fluorescent unit 160, the fixed fluorescent plate 164 is used, but a fluorescent wheel may be used as disclosed in Jpn. Pat. Appln. KOKAI Publication No. 2011-13320 so that the excitation light does not continuously strike one portion.

That is, the present invention is not limited to the above embodiments as it is, and an implementing stage of the invention, constituent elements can be modified and embodied without departing from the scope of the invention. Moreover, various inventions can be formed by suitably combining the constituent elements described in the embodiments. For example, even when several constituent elements are omitted from all the constituent elements of the embodiments, a constitution from which the constituent elements have been omitted can be extracted as the invention, as long as the problems described in the paragraphs of the problems to be solved by the invention can be solved and the effect of the invention can be obtained.

What is claimed is:

1. A light source device comprising:
a first light source which emits an excitation light;
a second light source which emits light of a first wavelength bandwidth;
a third light source which emits light of a second wavelength bandwidth different from the first wavelength bandwidth, the third light source including a plurality of light emitting sources which are arranged adjacent to each other via the second light source;
a fluorescent material which receives the excitation light from the first light source to emit generated light of a third wavelength bandwidth different from the first and second wavelength bandwidths; and
a dichroic mirror which transmits the light of the first wavelength bandwidth and reflects the light of the third wavelength bandwidth,
wherein the dichroic mirror is constituted such that (i) the excitation light emitted from the first light source is transmitted through the dichroic mirror and applied to the fluorescent material, (ii) the light of the first wavelength bandwidth emitted from the second light source is transmitted through the dichroic mirror and emitted in a predetermined emitting direction, (iii) the generated light emitted from the fluorescent material is reflected by the dichroic mirror and emitted in the predetermined emitting direction, (iv) the light of the second wavelength bandwidth from at least a first light emitting source of the third light source which is disposed on a first side of the second light source passes outside of the dichroic mirror without entering the dichroic mirror and is emitted in the predetermined emitting direction, and (v) at least a part of the light of the second wavelength bandwidth from at least a second light emitting source of the third light source which is disposed on the other side of the second light source is transmitted through the dichroic mirror and emitted in the predetermined emitting direction.

2. The light source device according to claim 1, wherein the dichroic mirror is configured such that all the light of the second wavelength bandwidth from the at least the second light emitting source of the third light source disposed on the other side of the second light source is transmitted through the dichroic mirror and emitted in the predetermined emitting direction.

3. The light source device according to claim 1, further comprising a retracting mechanism which retracts the dichroic mirror from an optical path of the at least the part of the light of the second wavelength bandwidth from the at least the second light emitting source of the third light source, when the third light sources are lit.

4. A projector comprising:
the light source device according to claim 1;
a display device;
a light source side optical system which guides the light from the light source device to the display device;
a projecting side optical system which projects an image emitted from the display device; and
a projector control section which controls the light source device and the display device.

5. A light source device comprising:
a single light source which includes a plurality of light emitting sources; and
a dichroic mirror which transmits or reflects light emitted from a first portion of the single light source using a first part of the plurality of light emitting sources,
wherein light emitted from a remaining portion of the single light source, other than the first portion, passes outside of the dichroic mirror without entering the dichroic mirror; and
wherein the remaining portion of the single light source includes a remaining part of the plurality of the light emitting sources, other than the first part.

6. The light source device according to claim 5,
wherein the dichroic mirror transmits or reflects light emitted from a first part of a single one of the plurality of light emitting sources of the single light source, and
wherein light from a remaining part of the single one of the plurality of light emitting sources of the single source, other than said first part of the single one of the plurality of light emitting sources, passes outside of the dichroic mirror without entering the dichroic mirror.

* * * * *